J. B. N. CARDOZA.
SYSTEM OF ELECTRICAL DISTRIBUTION.
APPLICATION FILED OCT. 17, 1919.
1,362,844.
Patented Dec. 21, 1920.
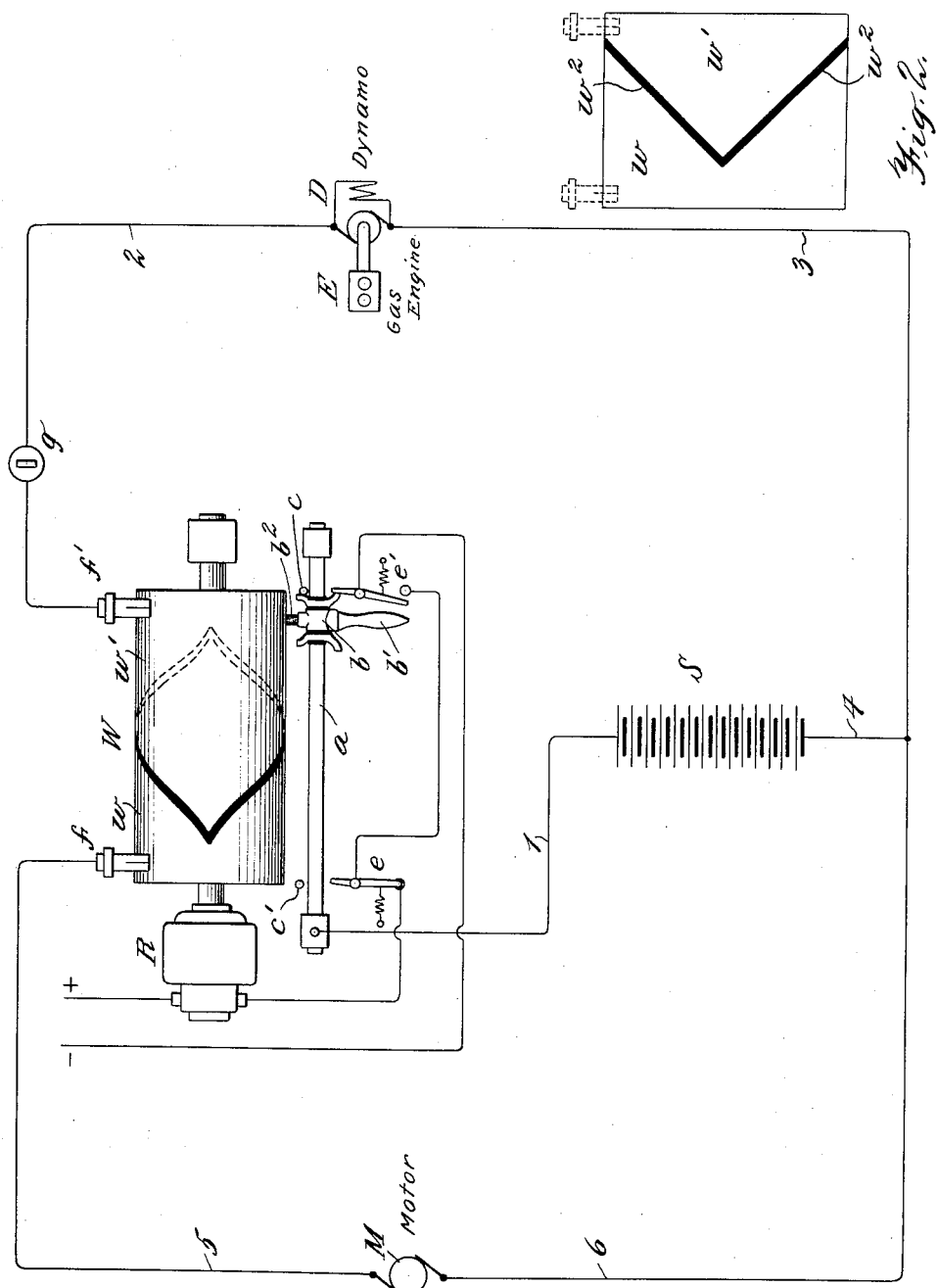

UNITED STATES PATENT OFFICE.

JOHN B. N. CARDOZA, OF VIRGINIA BEACH, VIRGINIA.

SYSTEM OF ELECTRICAL DISTRIBUTION.

1,362,844.   Specification of Letters Patent.   Patented Dec. 21, 1920.

Application filed October 17, 1919. Serial No. 331,361.

*To all whom it may concern:*

Be it known that I, JOHN B. N. CARDOZA, a citizen of the United States, residing at Virginia Beach, in the county of Princess Anne and State of Virginia, have invented certain new and useful Improvements in Systems of Electrical Distribution, of which the following is a full, clear, and exact description.

This invention relates to systems of electrical distribution and has special reference to electric power plants wherein the main source of power is a storage battery. The object of the invention is to provide a simple method of and apparatus for controlling the current in one or more translating circuits from a suitable source of current, and for charging and discharging a storage battery so that the latter may be "boosted" at frequent intervals during all times when it is in active service. The invention consists generally in delivering current from any suitable source to a translating device or devices by impulses of sufficient frequency and duration to maintain said devices in continuous operation at any load up to a maximum and, when said source is a storage battery, in intermittently charging the battery in the intervals between said impulses, the discharging and charging operations immediately following each other in rapidly succeeding cycles and being variable in their relative duration whereby the discharging periods may be lengthened or shortened in accordance with the load and the intervening charging periods correspondingly shortened or lengthened to maintain the battery at the highest possible state of charge at all times. More specifically the invention comprises a continuously rotating switch, during a portion of each rotation of which the supply circuit is closed through a motor, lamps or other translating device, or devices, while during the remaining portion of each rotation the supply circuit, if the source be a storage battery, is open and the charging circuit for the battery is closed, these cycles being repeated continuously at a speed depending upon the rapidity of rotation of the switch, which preferably may range from a few hundred to a thousand or more revolutions per minute. By a suitable adjusting device the division of each cycle or rotation into discharging and charging periods to vary the relative duration thereof is readily accomplished and it follows that with such an adjusting device the translating devices can be controlled to operate from zero to full capacity.

In the detail description which follows reference will be made to the acompanying drawing, in which—

Figure 1 is a diagram of the circuits and conventional representation of apparatus by which my invention may be carried out;

Fig. 2 is a development in a plane of the cylindrical surface of the rotary switch, and Fig. 3 is a modification.

Referring to the drawing, S indicates a storage battery, M an electric motor or other translating device or consumer of current, D a dynamo electric machine and E a gas engine directly connected to drive the dynamo. W is a rotating cylinder or drum, mounted in suitable bearings and driven at high and uniform speed by any suitable motive device, a small electric motor R being indicated for this purpose. The surface of cylinder W is composed of two conducting segments $w$ and $w'$ insulated from each other by a narrow strip of insulating substance $w^2$. The two segments are similar in shape, being that of two triangles with their bases toward the respective ends of the cylinder and their abutting sides defined by the two strips of insulating material $w^2$, $w^2$. In the development of the surface of the cylinder shown in Fig. 2, it will be seen that when the upper and lower edges are joined the two segments will have the same triangular shape, as explained. The cylinder extends slightly beyond the apex of each segment to provide a zone or belt at each end of the cylinder covered wholly by the respective segments whereas at all intermediate points along the cylinder the surface is occupied partially by one segment and partially by the other, the relative proportions of the two segments at any given zone or plane depending upon the distance of the zone or plane from an end of the cylinder.

Arranged parallel to the cylinder is a fixed guide rail $a$ upon which a carriage $b$ is adapted to slide, the travel of the carriage being substantially equal to the length of the cylinder. The carriage is provided with a handle $b'$ by which it can be manipulated and it also carries a contact brush or pencil $b^2$ which bears upon the surface of the cylinder. Two stops $c$ and $c'$ limit the travel of the carriage in each direction and adjacent the terminals of travel of the carriage are cut-out switches $e$ and $e'$ respectively, which are opened by the carriage when it arrives at the ends of its travel. On leaving an end of its travel the carriage permits the corresponding switch to close under the action of a spring. These switches are in series with each other and with the motor R, so that when either of them is opened the motor stops and the cylinder remains stationary until the carriage is moved to permit the open switch to close. $f$ and $f'$ are two contact brushes bearing constantly upon the respective segments $w$ and $w'$ of the cylinder.

The operation is as follows: the apparatus, as shown is in condition for "charging" the battery and to start this operation the attendant merely closes the switch $g$ in wire 2. This completes a circuit from the battery by wire 1 to guide rail $a$, carriage $b$ brush $b^2$ segment $w'$ of the cylinder, brush $f'$, wire 2, dynamo D, wire 3, and wire 4 to the battery. A current is therefore delivered from the battery to the dynamo and the latter acting as a motor "cranks" or starts the gas engine E which promptly speeds up until the electro-motive force generated by the dynamo exceeds that of the battery, whereupon the battery receives a constant charging current. The cylinder W meanwhile is stationary because switch $e'$ is open, and the battery may be kept on charge in this way as long as desired, the current flowing uninterruptedly through the segment $w'$. When it becomes necessary to start and operate the motor M, the handle $b'$ is moved to the left, switch $e'$ automatically closes and the cylinder commences to rotate. Continued movement of the handle to the left at once brings the brush $b^2$ into a zone of the cylinder where during each rotation thereof the apex of segment $w$ will be crossed by the brush and for the instant while the brush is thus traversing segment $w$, the charging current will be cut off from the battery by the insulating strips $w^2$ between the segments and the battery will send an impulse of current through the motor M, by way of segment $w$, brush $f$, wire 5, motor M, wire 6 and wire 4. This momentary impulse followed by others of the same or slightly increased duration, at great rapidity due to the high speed of rotation of the cylinder, will start the motor, and its speed may be gradually increased by continuing the movement of the handle $b'$ to the left which movement is accompanied by increases of the dwell of brush $b^2$ on the segment $w$ during each rotation of the cylinder because of the widening field of the segment traversed by the brush. As the control handle moves to the left, therefore, the motor not only receives impulses of longer duration, but at shorter intervals, so that eventually it may be given any amount of current within a given time up to its full requirements, the switch thereby serving as a controlling device for the motor M, or such other devices as may be included in the discharging circuit of the battery. In the intervals when the motor does not receive current it continues in motion by its momentum, so that when once started its action is continuous, but its speed will depend upon the rapidity and length of the current impulses delivered to it. If the conditions of load require that the battery current shall flow uninterruptedly to the motor or translating devices, the handle $b'$ may be carried to the limit of its travel to the left, at which point brush $b^2$ will rest upon an endless portion of segment $w$ and the cylinder will come to rest by the opening of cutout $e$. Obviously the stopping of the cylinder when the controller arrives at either end of its travel is not an essential part of the invention, since the result would be the same in so far as the charging and discharging is concerned whether the cylinder is in motion or stationary while the brush $b^2$ is in a zone which does not include both segments. But for the sake of economy of operation, and preservation of the apparatus, it is better to drive the cylinder only when necessary. In this connection it may be pointed out that under full load conditions the translating devices might respond to the demand even if the current from the battery was cut off for a brief instant in each cycle of rotation of the cylinder, which would occur, for instance, if the apex of segment $w'$ extended to the left end of the cylinder as seen in Fig. 3 instead of stopping short thereof. In this case the cut-out $e$ would be omitted and the cylinder allowed to rotate while the controller is in full load or full speed position. An advantage in such an arrangement is obtained in the effect it would have upon the battery since a battery will remain in better condition when discharged and charged at short intervals than when allowed to remain on discharge for a long period or until depleted and then charged. One feature of this control is that there is no time when the charging circuit is connected in multiple with the battery and discharging or translating circuit; or, in other words, the battery is never "floated." The charging unit is never called upon by the translating devices to help the battery. This is clear from the fact that when the brush $b^2$ passes from the discharging segment $w$ to the charging segment $w'$ or vice versa, one circuit is opened and entirely disconnected from the other and from the battery, while the other circuit is connected to the battery. For this reason the size and output of the charging set D E can be predetermined to charge at a uniform normal rate and the amount of charge delivered to the battery will then be determined by the total time during which the charging circuit is closed during a given period of operation. While the battery is in use the aggregate time of discharge may be greater than the aggregate time of charge but in certain classes of work such as the driving of an electric truck or automobile which often stops for traffic, loading, unloading and so-forth, there are long intervals when the charging circuit is held continuously closed and these intervals together with the impulse periods of charge while running, will be sufficient to considerably increase the mileage per day of the vehicle. In other words an electric truck equipped with a comparatively small charging dynamo and engine and operated on the plan herein described will be able to take advantage of all of the idle periods of the truck and a substantial portion of the active periods thereof to augment the ampere hours in the battery and in this way enable the truck to operate for a greater mileage before its battery has to be charged or another substituted than it could if the battery were not charged at all during its period of use. It will be seen also that the charging of the battery is an automatic operation from the moment the switch $g$ is closed since whenever the working or discharge circuit is opened by the rotating cylinder the charging circuit is closed. In this respect the invention would be carried out in any type of controller which in moving to its "off" position to open the work or discharge circuit, would automatically close a charging circuit. For electric truck work it is preferable to use a charging set only sufficiently large to keep the truck in operation a full day without the necessity of changing batteries, since then the weight and size of the set would be practically negligible. But for a stationary installation, the charging set or circuit would not be limited in size or capacity except as good practice may dictate. As a stationary installation the invention would be especially applicable wherever the load is variable. For instance, in a system where lights are in the consumption circuit which require to be dimmed from time to time, it will be seen that with the controller herein described any amount of current can be delivered to the lamps to affect their brilliancy as required, without the usual rheostat losses. At all positions of the controller the impulses of current to the lamps will be so frequent that the eye cannot detect the intervals of no current and flickering will not appear. When the impulses are of short duration and infrequent the lamps will afford the lowest candle power while increases in the duration of the impulses together with decreases of the length of the intervals will increase the candle power. If in the operation of the lights the source of current supply is a storage battery the controller can perform its dual function of simultaneously controlling the lights and charging the battery and thereby not only eliminate the losses due to controlling resistances but "boost" the battery and retain it on discharge for longer periods.

It will be understood that the essential feature of the invention is the controlling switch and its mode of operation, so that from a broad standpoint the current for charging the battery may be supplied from any source and not necessarily from a special charging set, and also that the battery may be regarded as any source of current the output of which may be distributed by the controlling switch to either of two consumption circuits or to only one such circuit. The distribution to one circuit from a battery may be with or without association with a charging circuit.

The periods of charging and discharging the battery so closely follow each other in alternation, that the battery can be kept at a comparatively high state of charge and need not at any time be completely discharged. This increases the life of the battery and enables the use of a smaller battery to do a given work since it may never be operated at a low state of charge. It is also pointed out that the rate of discharge during the periods when the translating circuit is closed is not affected by this apparatus and the rate of charging is not affected in any way by the rate of discharge. With a properly determined rate of charge with respect to the aggregate time the battery will be on charge during a given working period, the ampere hours put into the battery may be equal to the ampere hours taken out during the entire working period, so that the battery may remain continuously in service instead of being removed at intervals for charging. The rate of charge and consequently the size of the charging set to enable a battery to remain in service for a given period is determined by the aggregate time during the period that the battery will be charging.

An electric truck capable of making 45 miles in four hours of actual running during a ten hour day on a 300 ampere hour battery can do 60 miles in the same time if the charging set delivers to the battery approximately 16 amperes per hour during the other six hours. An electric truck can thereby be made to successfully compete with the gas driven truck in respect to practical commercial mileage requirements, with the addition thereto of a charging set so small and light as to be substantially negligible.

I claim:

1. The method of operating a storage battery power plant which consists in delivering a discharging current from the battery to a translating device or devices intermittently and at sufficiently frequent intervals to keep the device or devices in continuous operation, delivering a charging current to the battery in the intervals while it is not discharging and inversely varying the relative duration of the discharging and charging periods.

2. The method of operating storage batteries which consists in alternately discharging and charging the battery and inversely and proportionally varying the duration of the discharging and charging periods.

3. The method of operating storage batteries which consists in discharging the battery during a portion of a certain period, charging the battery during the remaining portion of said period, repeating the periods indefinitely and varying the relative duration of the said two portions of the repeated periods.

4. A storage battery installation comprising a storage battery, a discharging circuit, a charging circuit and a controlling switch, said switch having two movements one of which alternately opens one of said circuits and closes the other, while the other varies the relative duration of the open and closed periods of said circuits.

5. An electric power system, comprising a storage battery, a discharging and a charging circuit therefor, a switch comprising a rotary cylinder provided with two insulated conducting segments and a contact adapted to be shifted from one segment to the other, said segments being the terminals respectively of said two circuits, the other terminals of which both connect with one pole of the battery while the other pole of the battery is connected with the shiftable contact, the segments having adjoining edges extending spirally along the face of the cylinder.

In witness whereof I hereunto subscribe my signature.

JOHN B. N. CARDOZA.